United States Patent [19]
LePage

[11] 3,975,293
[45] Aug. 17, 1976

[54] BODIES OF SILICEOUS GELS HAVING LARGE PORES AND PROCESS FOR PREPARING SAME

[75] Inventor: Madeleine LePage, Paris, France

[73] Assignee: Produits Chimiques Pechiney-Saint Gobain, Neuilly-sur-Seine, France

[22] Filed: Oct. 11, 1973

[21] Appl. No.: 405,552

Related U.S. Application Data

[63] Continuation of Ser. No. 147,241, May 26, 1971, abandoned.

[30] Foreign Application Priority Data
June 4, 1970 France .............................. 70.20514

[52] U.S. Cl. .............................. 252/317; 210/31 C; 252/451; 423/338
[51] Int. Cl.² ..................... B01J 13/00; C01B 33/16
[58] Field of Search ............. 252/317, 451; 423/338

[56] References Cited
UNITED STATES PATENTS

| | | | |
|---|---|---|---|
| 1,772,055 | 8/1930 | Miller et al. | 423/338 |
| 2,302,297 | 11/1942 | Connolly | 252/453 X |
| 2,477,695 | 8/1949 | Kimberlin, Jr. | 252/317 X |
| 2,484,258 | 10/1949 | Webb et al. | 252/451 X |
| 3,538,212 | 11/1970 | Beau et al. | 252/317 |

Primary Examiner—Richard D. Lovering

[57] ABSTRACT

This invention is directed to: (1) a process for increasing the pore diameter of siliceous gels without decreasing the pore volume in which a siliceous hydrogel is dried at a temperature of up to 500°, C, to produce a siliceous gel having an average pore diameter greater than 40 A, and then contacted with an ammoniacal medium; and (2) the product produced by said process.

15 Claims, No Drawings

BODIES OF SILICEOUS GELS HAVING LARGE PORES AND PROCESS FOR PREPARING SAME

This is a continuation of application Ser. No. 147,241, filed May 26, 1971, now abandoned.

This invention relates to bodies of siliceous gels having large pores, diversified ranges of porosity and porous volumes, obtained by treatment of dried siliceous hydrogels in an autoclave under ammoniacal reaction conditions.

It is well known that the bodies of silica gels or materials essentially composed of silica gels find many applications in various areas such as adsorption, chromatography and catalysis.

In general, these bodies must have mechanical properties of abrasion resistance and crushing strength which are absolutely necessary for the purposes of any one of their uses, but also particular porous characteristics for the desired use.

It has long been sought to discover processes leading to an evolution of porous characteristics of siliceous gels which are capable of providing pores having greater sizes than those of freshly prepared gels.

It is known that in the usual practice, alkali metal silicates, and primarily sodium silicates, are the starting point of the greatest number of siliceous gels used industrially, for largely economic reasons. Generally speaking, these siliceous gels are obtained by drying hydrogels having a high water content resulting from the acidification under certain conditions of solutions of alkali silicates, with the result that the gels obtained are highly filled with alkaline salts corresponding to the acids used and, furthermore, may have a certain residual alkalinity resulting from an incomplete neutralization of these alkaline silicates. These gels, principally depending on the conditions of precipitation and washing of the hydrogels, have variable specific surfaces and also variable porous volumes.

In the French patents Nos. 1,473,240 and 1,482,867, it has been found that by the calcination of silica gels containing determined amounts of alkali metal salts and having a residual alkalinity, at temperatures capable of ranging from 400°C. to 1200°C., it should be possible to obtain gels with definite and reproducible porosities, having pores of variable sizes ranging up to several thousands of angstroms, whereas the initial gels merely dried under careful conditions have specific surfaces ranging from several hundreds of m²/g., which correspond to porosities defined by very fine pores.

The use of gels obtained by such processes, in some cases may be disadvantageous due to the presence of compounds of alkali metals which remain during the formation of these gels, compounds which are then very difficult to eliminate by treatments of usual washings. Moreover, the silica gels thus obtained having a porosity in the form of large pores exhibit, for the highest calcination temperatures, a tendency towards crystalline forms of the silica, which may not be desired in some applications, and also a perceptible decrease of the initial porous volume.

The general effects of treatment of calcined siliceous gels with ammonia are known as favoring the formation of a porosity defined by large pores. The treatment of siliceous hydrogels, freshly prepared with ammonia entails a rapid contraction of these hydrogels by elimination of water, with a simultaneous increase of the pore sizes.

Nevertheless, these various methods previously described, do not lead to the desired results, particularly with regard to the treatment of freshly prepared hydrogels whose texture is very brittle and in a rapid evolution state. In regard to the ammonia treatment of calcined gels, the texture of the resulting products is not sufficiently modified by this ammonia treatment due to the tendency to form this same texture initiated by the calcination.

It has now been found that it is possible to impart to bodies of siliceous gels obtained by washing and drying of hydrogels, wide ranges of porosity defined by large-sized pores by treatment of the gels under pressure in an autoclave in an ammoniacal medium, either in the vapor phase, or in the liquid phase, without destruction of the gel to obtain an extension of the average diameter of the pores while maintaining the initial porous volume, provided that the average diameter of the pores of the bodies of siliceous gels treated are greater than about 40 A. These very diversified ranges of porosity are particularly interesting for chromatographic applications. The bodies thus obtained frequently have a greater purity as a result of very complete initial washings, which is often an appreciable advantage.

To obtain gels suitable for treatment in an autoclave in the presence of an ammoniacal medium, it has been found in the practice of the invention that the drying of the siliceous hydrogels is necessary for, contrary to that what has been proposed previously, the treatment of hydrogels obtained by various processes from silicates under pressure in a liquid medium in the presence of ammonia lead most frequently to destruction of the hydrogels. This drying of the hydrogels can be carried out at a low temperature, such as it is often done industrially, and, under these conditions, the further evolution of the gels thus obtained is the most marked. In general, the hydrogels can be dried at temperatures ranging up to 400° to 500°C. if it is not desired to obtain, for the upper limit of temperature stated, a porous distribution of great pores somewhat different of that obtained from hydrogels dried at a lower temperature.

It has been found that drying carried out at various temperatures up to limits previously stated give results which are not different from each other with regard to the average diameter of the pores and the porous volume of the dry products obtained. However, the use of an ammoniacal medium under pressure reveals by the results obtained a certain progressive evolution of characteristics of the bodies in dependence of this drying temperature, which evolution becomes more and more rapid as the drying temperature rises. For temperatures greater than those stated, this drying becomes as a matter of fact a calcination which results in a decrease in the specific surfaces. Nevertheless, it is possible to observe that when siliceous hydrogels are progressively heated at rising temperatures, the water loss is not linear in dependence of the temperature: the adsorbed water is rapidly carried away by drying at a low temperature. Afterwards, the remaining water, which corresponds to the water bonded to the dry gels, thus obtained, is at first only slowly removed as the temperature rises; then this elimination rises to a maximum of speed, this maximum ranging fairly in the range from 400°C. to 500°C. stated previously as being the limit which can be considered drying, as opposed to calcination.

The pressures applied in the treatment of bodies of siliceous hydrogels according to the invention may be relatively low. However, the evolution of these bodies in the presence of an ammoniacal medium is more rapid at higher pressures. In practice a pressure of some tens of bars is sufficient, although pressures in the range of 50 bars can be exceeded without difficulty. At higher pressures more expensive equipment is frequently required.

The concentration of ammonia in the aqueous medium has an effect on the magnitude and the speed of the results obtained. Nevertheless, a concentration greater than 100 g/l of ammonia in the medium does not bring any more improvement in the speed of the process.

The duration of treatments of bodies of siliceous gels must be sufficient in order that the temperature is fairly equal in all points of a given mass of these bodies. In practice, the duration of treatment of a few hours is sufficient for masses having an industrial importance.

Lastly, the treatment according to the present invention can be carried out in the vapor phase or in the liquid phase. It is often preferred to operate in the vapor phase since the porosity of samples drawn off at various points in significant amounts thus treated is less varied. However, the treatment in the liquid phase gives more varied porous dispersions which may be desirable for certain applications.

As will be appreciated by those skilled in the art, instead of ammonia, use can be made of a variety of other ammoniacal mediums, such aliphatic amines, and particularly alkyl amines, and alkylene diamines, such as ethyl amine, ethylene diamine, propyl amine, propylene diamine, diethylene triamine, etc.

It stands to reason that the parameters previously stated are to be considered in the whole and that the determination of the operating conditions and the selection of the characteristics of the bodies of the initial siliceous gels must be done for the purpose of any predetermined result sought. Thus, since the treatments according to the practice of the invention practically modify only slightly the initial porous volumes of the bodies of siliceous gels, the selection of the method of preparation of these bodies must be made in order that they fairly have the same porous volumes as those desired in the completed products since the other parameters provide the various ranges in porosity.

In the following examples there are provided by way of illustration, and not of limitation, a number of examples relating to the evolution in an autoclave and in the ammoniacal medium of balls of siliceous gels obtained by coagulation of sols in a water-immiscible liquid, and an example relating to extruded products. It will be understood that other forms of bodies of siliceous gels, if their initial properties are identical to those of these balls or extruded products, give identical results. These other forms, for instance may be fragments obtained by crushing of set gels or agglomerated products obtained by composition.

EXAMPLE 1

This example demonstrates that the initial drying of bodies of siliceous gels must be carried out at a relatively low temperature in order not to adversely affect their possibilities of forming in an autoclave in a medium containing ammonia bodies having porosities composed of large-sized pores.

Silica hydrogel balls obtained from sodium silicate are washed in order that their remaining $Na_2O$ content does not exceed 0.02% by weight based on the silica. These balls, once dried at low temperature of about 100C., have an average diameter from 100 to 200 $\mu$ and a porous volume of 1.05 cm²/g. with the average diameter of the pores being 120 A.

Three other samples of the same balls of hydrogel are are dried at 400°C., 600°C. and 800°C. and then the four samples thus obtained are treated in the vapor phase for 3 hours under a pressure of 40 bars in an autoclave, the liquid being an aqueous ammonia solution at a concentration of 25 g/l.

The following Table I states the measured characteristics on the products thus obtained. These characteristics are the porous volume V, the average diameter $\phi_M$ of pores and the range of pore diameters.

Table I

| Drying temperature in °C. | V (cm³/g) | $\phi_M$ (A) | Dispersion of Pores (in A) |
|---|---|---|---|
| 100 | 1.0 | 850 | 600 to 1200 |
| 400 | 1.0 | 700 | 450 to 1100 |
| 600 | 1.0 | 410 | 300 to 700 |
| 800 | 1.0 | 420 | 300 to 700 |

This table shows that the diameter of the pores obtained is much greater when the drying temperature of the gel is low, and that, above 400°C., it is more difficult to obtain the enlarging of the sizes of the pores. Moreover, it is noticeable that the porous volume does not change significantly.

EXAMPLE 2

This example relates to treatment in an autoclave in the vapor phase under a pressure of 10 bars for 3 hours, the liquid in the autoclave being an ammonia solution at 5 g/l. This treatment is carried out on silica gel balls from 40 to 350 $\mu$ in diameter obtained by drying hydrogel balls which have a porous volume of 0.7 cm³/g. and an average diameter of pores of 60 A. The results obtained, after the autoclaving, for drying of these balls at various temperatures are summarized in the following Table II.

Table II

| Drying temperature in °C. | V (cm³/g) | $\phi_M$ (A) | Dispersion of Pores (in A) |
|---|---|---|---|
| 150 | 0.7 | 440 | 300 to 700 |
| 400 | 0.7 | 400 | 250 to 650 |
| 600 | 0.7 | 360 | 200 to 600 |
| 800 | 0.7 | 350 | 200 to 600 |

This example also shows the formation of the dried gels at lower temperatures toward a porosity composed of large sized pores.

EXAMPLE 3

This example demonstrates the effect of increasing amounts of ammonia in the water of the autoclave. The tests relate to the same silica gel balls as those described in Example 1 and dried at 100°C. Different samples of these balls are treated in the autoclave for 3 hours under a pressure of 10 bars, the water having various $NH_3$ contents. The results obtained are stated in the following Table III.

Table III

| NH₃ content of the water in the autoclave | Porous Volume V(CM³/g) | $\phi_M$ A | Dispersion of Pores (in A) |
|---|---|---|---|
| 0.06 | 1.06 | 130 | 80 to 350 |
| 0.25 | 1.00 | 360 | 200 to 700 |
| 0.50 | 1.05 | 500 | 300 to 800 |
| 1.0 | 1.02 | 520 | 300 to 800 |
| 2.5 | 1.05 | 600 | 350 to 900 |
| 5 | 1.00 | 700 | 400 to 1000 |
| 10 | 1.05 | 800 | 400 to 1100 |
| 25 | 1.02 | 820 | 400 to 1100 |
| 60 | 1.01 | 800 | 400 to 1100 |
| 95 | 1.01 | 840 | 450 to 1200 |

These results show that above a certain ammonia content of the water in the autoclave, an increasing of the ammonia content has only a limited effect with 100 g/l being the limit which need not be exceeded.

EXAMPLE 4

In this example, ammonia has been replaced by two other bodies having an ammoniacal reaction which are ethyl amine and ethylene diamine and which are used at concentrations of 50 and 100 g/l. The same balls as used in Examples 1 and 3 are dried at 100°C. The tests are carried out for 3 hours under a pressure of 40 bars. The results are stated in the following Table IV.

Table IV

| Amine content of the water of the auto-clave (g/l) | V (cm³/g) | $\phi_M$ (A) | Dispersion of Pores (in A) |
|---|---|---|---|
| ethyl amine 50 | 1.09 | 700 | 400 to 1400 |
| ethylene diamine 100 | 1.07 | 750 | 400 to 2000 |

The results show an analogy with those obtained with ammonia.

EXAMPLE 5

This example relates to a treatment in an autoclave in the ammoniacal liquid medium. Two concentrations are used: 0.25 and 25 g. of NH₃ per liter in the water in the autoclave.

The balls used are the same as those of Examples 1,3, and 4 are dried at 100°C. The results obtained for treatment of 3 hours under a pressure of 40 bars are stated in the following Table V.

Table V

| NH₃ content of the water of the auto-clave (g/l) | V (cm³/g) | $\phi_M$ A | Dispersion of Pores (in A) |
|---|---|---|---|
| 0.25 | 0.98 | 210 | 100 to 300 |
| 25. | 0.80 | 720 | 350 to 1700 |

This example shows that the use in a liquid phase is also possible.

EXAMPLE 6

This test relates to extruded bodies of 3 mm in diameter and 5 mm in height obtained from silica hydrogel microballs. These extruded products, dried at 120°C., have a porous volume of 1 cm³/g. and an average diameter of the pores of 125 A. Two samples are treated: the first in the vapor phase and the second in the liquid phase, both for 3 hours under a pressure of 40 bars with a NH₃ content of the autoclave water of 50 g/l.

The results obtained are stated in the following Table VI.

Table VI

| Treatment Conditions | V (cm³/g) | $\phi_M$ A | Dispersion of Pores (in A) |
|---|---|---|---|
| Vapor phase | 1.00 | 1030 | 800 to 1200 |
| Liquid phase | 1.01 | 350 | 100 to 800 |

This example shows that the evolution in the liquid phase, although similar to that in the vapor phase, leads to smaller average diameters of pores and to still different porous dispersions or ranges.

The preceding examples should not be construed as restricting the invention to silica gels. Bodies of siliceous gels containing other oxides not hindering the evolution of the porosity characteristics of the silica gel; such as bodies containing magnesium, aluminum and zirconium oxides or hydroxides, and have a great number of catalytical applications.

It will be understood that various changes and modifications can be made in the details of procedure, formulation and use without departing from the spirit of the invention, especially as defined in the following claims.

I claim:

1. A process for increasing the pore diameter of siliceous gels without decreasing the porous volume comprising drying a siliceous hydrogel at a temperature of up to 500°C to produce bodies of a siliceous gel having an average pore diameter greater than 40 Angstroms and contacting the resulting bodies with an ammoniacal medium in the liquid or gaseous phase in an autoclave under a pressure of up to 50 bars.

2. A process as defined in claim 1 wherein the contacting is carried out in the vapor phase.

3. A process as defined in claim 1 wherein the contacting is carried out in the liquid phase.

4. A process as defined in claim 3 wherein the liquid phase is formed of an aqueous solution of ammonia.

5. A process as defined in claim 1 wherein the ammoniacal medium is selected from the group consisting of ammonia and aliphatic amines.

6. A process as defined in claim 1 wherein the siliceous hydrogel is a silica hydrogel.

7. A process as defined in claim 1 wherein the siliceous hydrogel is a hydrogel selected from the group consisting of a silica hydrogel and a mixture of a silica hydrogel with the oxide or hydroxide of one or more metals.

8. A process as defined in claim 1 wherein the siliceous hydrogel is in the form of balls.

9. A process as defined in claim 1 wherein the siliceous hydrogel is in the form of crushed fragments.

10. A process as defined in claim 1 wherein the siliceous hydrogel is in the form of agglomerated products produced by extrusion or compression.

11. Bodies of a siliceous gel produced by the process defined in claim 1.

12. A process for increasing the pore diameter of siliceous gels without decreasing the porous volume comprising drying a siliceous hydrogel at a temperature of up to 500°O to produce bodies of a siliceous gel having an average pore diameter greater than 40 Angstroms and contacting the resulting bodies with an ammoniacal medium in the liquid or gaseous phase in which the concentration of the ammoniacal medium ranges up to 100 g/l in an autoclave under a pressure up to 50 bars.

13. A process for increasing the pore diameter of silica gels without decreasing the porous volume comprising drying a silica hydrogel at a temperature of up to 400°C to produce bodies of silica gel having an average pore diameter greater than 40 Angstroms and contacting the resulting bodies with an ammoniacal medium selected from the group consisting of ammonia and aliphatic amines in the liquid or gaseous phase in an autoclave under a pressure up to 50 bars.

14. A process as defined in claim 13 wherein the concentration of the ammoniacal medium ranges up to 100 g/l.

15. A process for increasing the pore diameter of silica gels without decreasing the porous volume comprising drying a silica hydrogel at a temperature of up to 400°C to produce bodies of a silica gel having an average pore diameter greater than 40 Angstroms and contacting the resulting bodies with an ammoniacal medium in the liquid or gaseous phase in an autoclave under a pressure up to 50 bars.

* * * * *